Patented Jan. 7, 1936

2,026,875

UNITED STATES PATENT OFFICE 2,026,875

SULPHUR-CONTAINING PLASTIC AND PROCESS OF MAKING SAME

Carleton Ellis, Montclair, and William P. ter Horst, Wayne, N. J., assignors to Ellis-Foster Company, a corporation of New Jersey No Drawing. Application October 15, 1931, Serial No. 569,112

28 Claims. (Cl. 106—22)

This invention relates to sulphur plastics and relates particularly to resinous and plastic bodies obtained by reaction of chlorhydrins having three or more carbon atoms in the molecule with a sulphide such as an alkali polysulphide, including sodium, potassium, ammonium, calcium, and analogous polysulphides, and relates particularly to certain products obtained by the reaction between a sulphur yielding compound, such as alkaline polysulphide and glycerol dichlorhydrin, especially the alpha chlorhydrin.

The invention will be illustrated by numerous examples showing methods of preparation of the sulphur resin or plastic and its incorporation with various other bodies to make compositions suitable for various industrial uses. In the following examples the proportions given are parts by weight.

Example 1

100 parts alpha dichlorhydrin were gradually added to a solution of 300 parts sodium sulphide $(Na_2S,3H_2O)$ in 200 parts water. These proportions correspond with about 1 mol of the dichlohydrin with about 3 mols of the sodium sulphide. As the alpha dichlorhydrin is added an exothermic reaction takes place and a white plastic separates. After washing with water a white material remains which although generally insoluble can be dissolved in hexahydrophenol (hexalin), diethylene glycol, diethylene glycol monoethylether (carbitol), ethylene chlorhydrin, and in diethylene dioxide (dioxan). Solutions so obtained are to some extent compatible with solutions of nitrocellulose in the same solvents and greatly improve the characteristics of the nitrocellulose film by making the same more flexible. A film deposited from the diethylene dioxide solution is colorless and after baking for 6 hours at 100–110° C. is resistant to solvents.

Example 2

If, instead of adding dichlorhydrin to sodium sulphide solution, the sodium sulphide is added to the dichlorhydrin a white plastic is also formed. However, the product thus obtained is of a rubbery nature and cannot be dissolved in diethylene dioxide or hexahydrophenol. The product has excellent shock-resistant properties. Upon treatment with hot concentrated caustic soda solution the material reverts to a plastic similar in properties to the one described under Example 1. After caustic soda treatment the plastic becomes soluble in diethylene glycol monoethylether and in diethylene dioxide and hexahydrophenol.

Example 3

The material described under Example 1 is capable of forming an acetate. 84 parts alpha dichlorhydrin were added gradually over a period of one-half hour to 500 parts of a solution of sodium sulphide made as in Example 1. These proportions correspond with 1 mol of the dichlorhydrin to nearly 4 mols of the sodium sulphide. The plastic obtained was washed with water and dissolved in 20 parts diethylene glycol monoethylether. The temperature of the solution was raised to 120° C. in order to remove water. 72 parts acetic anhydride and 50 parts glacial acetic acid were added and the mass was refluxed for 6 hours. The plastic gradually dissolves and the solution was poured into 1000 parts of water. The acetate is essentially insoluble and can be separated by decantation. Whereas the non-treated product is soluble in diethylene glycol monoethylether, the acetate is no longer soluble. However, it is soluble in butyl and amyl acetates, in which latter solvents the untreated plastic was not soluble. The butyl acetate solution of this acetate product of the sulphur plastic is compatible with a solution of nitrocellulose in butyl acetate.

Example 4

A slightly different and often preferable method for the preparation of sulphur dichlorhydrin plastics is as follows: 126 parts sodium sulphide $(Na_2S,3H_2O)$ were dissolved in 200 parts diethylene glycol monoethylether and the solution heated until the temperature of the vapor reached 120° C. To this solution of essentially anhydrous sodium sulphide in diethylene glycol monoethylether was gradually added 129 parts alpha dichlorhydrin. A violent reaction took place. The temperature was kept at approximately 100° C. The solution was filtered hot from salt and the filtrate dried under vacuum to remove diethylene glycol monoethylether, which is recovered and used for the next batch. After removal of the diethylene glycol monoethylether a clear transparent plastic remains.

Example 5

The products described under Examples 1 and 4 can be readily emulsified according to the following procedure. 20 parts of a 50 per cent solution of the plastic described under Example 1 in diethylene glycol monoethylether is added slowly to a solution of 2 parts glycol stearate and 1 part sodium hydroxide in 34 parts of water. The temperature should be kept at 70° C. or higher and rapid agitation is necessary. A heavy emulsion is thus obtained which has been found useful in treating paper.

Example 6

The sulphur may be totally or partially substituted by selenium in the reaction with halogen hydrin, as illustrated by the following example. 12 parts selenium were dissolved in a solution of 5 parts sodium hydroxide in 25 parts water. The solution was filtered and 20 parts alpha dichlorhydrin slowly added. A violent exothermic reaction took place. After refluxing 1 hour the product which separated out was extracted with 3 per cent boiling sodium hydroxide solution and finally with water. The product obtained was a gray hard substance. Instead of using sodium hydroxide solution, one may dissolve selenium in a solution of sodium sulphide and use this strongly alkaline solution to react with dichlorhydrin. Instead of using water as a solvent, one may use other solvents, for example, methyl alcohol.

The above examples illustrate the plastics obtained from alpha dichlorhydrin and alkali monosulphide. Additional examples will be given later. In general these materials are white or light colored, flexible, soluble in hexahydrophenol and similar solvents and in phenolic compounds like phenol, cresol, xylenol. They are polymerized by the action of heat and/or acids like phosphoric acid, hydrochloric acid, acetic acid, formic acid, and/or aldehydes like formaldehyde, yielding tough polymerization products which show remarkable adhesive properties to metal or glass. Useful products may be obtained by dissolving the above plastics in phenol or cresol or xylenols and reacting their solutions with an aldehyde like formaldehyde. Reaction products of this type may be used for molding purposes.

If instead of the monosulphides, polysulphides are used, plastics result which usually have a sulphur content greater than about 35 per cent and which generally are less soluble in organic solvents. The amount of sulphur may be varied over a wide range, as shown by the following examples.

Example 7

100 parts alpha dichlorhydrin were gradually added to a solution of 150 parts sodium sulphide ($Na_2S,3H_2O$) and 64 parts sulphur in 300 parts water. After the dichlorhydrin was added the mixture was heated under a reflux condenser for 6 hours. A yellow plastic separated which was washed with dilute caustic soda solution and with water.

Example 8

100 parts alpha dichlorhydrin were gradually added to a solution of 150 parts sodium sulphide ($Na_2S,3H_2O$) and 96 parts sulphur in 300 parts water. The procedure outlined in Example 7 was followed and again a yellow plastic separated out which has a somewhat higher consistency than the product described in Example 7.

Example 9

100 parts alpha dichlorhydrin were gradually added to a solution of 150 parts sodium sulphide ($Na_2,3H_2O$) and 128 parts sulphur in 300 parts water. The procedure outlined in Example 7 was followed and again a yellow plastic separated which has a somewhat higher consistency than the product described in Example 7.

Example 10

The products described under Examples 7, 8 and 9 are soluble in hot hexahydrophenol or in mixtures of diethylene glycol monoethylether and diethylene dioxide. They are also soluble in concentrated sodium hydroxide solution and in phenolic compounds like phenol, cresol and xylenols.

Example 11

40.3 parts sodium hydroxide were dissolved in 100 parts water, 96 parts sulphur were added and the mass was heated under a reflux condenser until the sulphur had gone into solution. The solution contains sodium polysulphide, as a component. 50 parts alpha dichlorhydrin were then added. An exothermic reaction took place. After refluxing for 6 hours reaction was completed with formation of a yellow rubbery plastic of high luster. The plastic was washed with 1 per cent boiling caustic soda solution to remove unreacted sodium polysulphide and dried at 100–105° C. 15 parts of the plastic were dissolved in 45 parts hexahydrophenol and 2 parts cumaron resin were added. Films were deposited from this solution on metal and after baking at 80–120° C. showed excellent adhesion to metal, good hardness and chemical resistance.

Example 12

The sulphur plastics described in the foregoing have been found to be highly compatible with sulphur chloride phenol resins, giving products which are light colored flexible resins. Sulphur chloride phenol resin was prepared by adding a solution of 75 parts sulphur chloride in 100 parts benzol to a solution of 50 parts phenol in 100 parts benzol with agitation and cooling. The benzol was removed by distillation. A soft, straw-colored resin remained.

Equal parts of the above described sulphur chloride phenol resin and the sulphur dichlorhydrin plastic described in Example 11 were melted together, the temperature being held for 2 hours at 140–145° C. The two ingredients are mutually soluble. On cooling a light colored, flexible resinous product is obtained.

Example 13

Instead of using a sulphur chloride phenol resin one may use analogous resins produced from other phenolic compounds, for example xylenols. Sulphur chloride xylenol resin was made by treating 1 part of mixed xylenols dissolved in xylol with 1 part of sulphur chloride in xylol solution. After the exothermic reaction has taken place the xylol is removed by distillation. A yellow brittle resin remains. The alpha dichlorhydrin-sulphur plastic was made by adding 400 parts alpha dichlorhydrin to a solution of 512 parts sulphur and 520 parts sodium sulphide ($Na_2S,3H_2O$) in 1000 parts water. The mixture was heated under a reflux condenser for 6 hours and the plastic which separated was washed with water and vacuum dried. 6 parts of the dichlorhydrin sulphur plastic and 4 parts of the sulphur chloride xylenol resin were melted in an oil bath and the temperature held for 4 hours at 125–140° C. The two ingredients are mutually soluble and on cooling a flexible resin is obtained which has been found useful for various purposes.

Example 14

The plastic described under Example 13 made from dichlorhydrin and sulphur was used as a binder for wood flour. 20 parts of the plastic were mixed with 20 parts of wood flour and 4 parts cobalt blue at 70° C. The mixture when put on linoleum backing (burlap) and pressed 5 minutes at 80° C. at 2000 lbs. per square inch, yielded a flooring material.

Example 15

15 parts of wood flour was incorporated with 15 parts of the two-component resin described under Example 13, this being a mixture of dichlorhydrin sulphur plastic and sulphur chloride xylenol resin 2 parts cobalt blue were incorporated at approximately 80° C. On cooling the mass could be crumbled. The mixture was put on linoleum backing (burlap) and pressed in a die 5 minutes at 80° C. at 2000 lbs. per square inch pressure. The flooring material obtained showed excellent "healing" properties, by which is meant that dents made in the surface are spontaneously substantially effaced on standing.

*Example 16*

The plastic (without sulphur resin) made from dichlorhydrin and sodium polysulphide described under Example 13 can be fused with shellac. When equal weights of shellac and sulphur plastic are melted together at 140° C., at first a rubbery mass is formed which on cooling solidifies to a hard resin of extreme toughness. Solutions of dichlorhydrin sodium polysulphide plastic in an aqueous solution of sodium hydroxide and of shellac also in an aqueous solution of sodium hydroxide are compatible. Instead of an aqueous solution of sodium hydroxide one may use as the solvent diethylene glycol monoethylether.

*Example 17*

Alkali polysulphide may be reacted with a mixture of alpha dichlorhydrin and ethylene dichloride. 96 parts sulphur were dissolved in a solution of 40.3 parts sodium hydroxide in 100 parts water. To this solution of sodium polysulphide was added a mixture of 30 parts ethylene dichloride and 30 parts alpha dichlorhydrin. An exothermic reaction took place. After refluxing 4 hours a yellow plastic separated which was washed with water and dried at 100° C. The sulphur plastic made from ethylene dichloride alone possesses an offensive odor and is insoluble in hexahydrophenol. The plastic obtained from a mixture of ethylene dichloride and dichlorhydrin has a decidedly less disagreeable odor and is soluble in warm hexahydrophenol.

*Example 18*

The two-component resin described under Example 13, (sulphur chloride xylenol resin and dichlorhydrin sulphur plastic) has been found adaptable for making laminated paper because of its excellent adhesive properties. The material may be used as such or may be further cheapened by melting it with sulphur. 5 parts of the resin described under Example 13 and 3 parts of sulphur were melted and heated at approximately 120–140° C. for 2 hours. A clear product was obtained. The two-component resin as well as the product containing the free sulphur were melted and applied to a sheet of preheated cardboard and a second piece was applied thereto. After cooling an excellent laminated sheet was obtained.

*Example 19*

A resin can be made in one operation by reacting sulphur chloride on a mixture of phenol and glycerol and subsequent reaction with sodium polysulphide. Sulphur chloride and glycerol react at approximately 100° C. with formation of dichlorhydrin and elimination of hydrochloric acid. 47 parts phenol, 46 parts glycerol were dissolved in 100 parts xyol. 10 parts glacial acetic acid acting as a catalyst were added. To the solution 100 parts sulphur monochloride dissolved in 500 parts xylol was slowly added with vigorous agitation. A violent exothermic reaction took place. Cooling was applied to keep the temperature at approximately 100° C. The solvent was removed by steam distillation. The residue was treated with a solution of 130 parts sodium sulphide ($Na_2S,3H_2O$) and 100 parts of sulphur dissolved in 300 parts of water. An exothermic reaction took place and a yellow plastic separated similar in appearance and behavior to the one described under Example 12 (the two-component resin described in the second part of Example 12). Instead of phenol one may use other phenolic compounds such as cresol or xylenols and obtain resins similar to those described under Example 12.

The plastics made from dichlorhydrin and alkali polysulphides have the following general properties. They are soluble in warm hexahydrophenol and in mixtures of diethylene dioxide and diethylene glycol monoethylether. They are more readily soluble in concentrated aqueous solutions of sodium hydroxide than the corresponding compounds made from the monosulphides. Their alkaline solutions can be diluted with water without precipitating the plastic. Such solutions are compatible with viscose and with alkaline solutions of shellac. Solutions of the plastics in organic solvents often are compatible with cellulose nitrate solutions. Whereas the plastics made from the monosulphides are soluble in phenolic compounds, the ones made from alkali polysulphides are only slightly or not soluble in phenol or cresol or xylenols. By melting these plastics with sulphur chloride phenolic resins, light colored flexible resins are obtained which are easily soluble in diacetone alcohol.

*Example 20*

The dichlorhydrin sulphur plastics described under Examples 1 and 9 react readily with sulphur chloride with formation of rubbery material which is somewhat soluble in diacetone alcohol. 23 parts sulphur chloride were added to 30 parts dichlorhydrin sodium monosulphide plastic. As the sulphur chloride is added a violent reaction takes place. The temperature should be kept below 60° C. A light yellow, rubbery plastic results.

*Example 21*

The dichlorhydrin sodium monosulphide plastic described under Example 1 reacts readily with phosphoroxychloride. Whereas the untreated plastic is insoluble in diacetone alcohol, the plastic after treatment with phosphoroxychloride gives approximately up to 20 per cent solutions in diacetone alcohol. Films deposited from the diacetone alcohol solution showed good luster and resistance, especially after baking 4 hours at 100° C. 17 parts phosphoroxychloride were slowly added to 30 parts dichlorhydrin sodium monosulphide plastic. Cooling was applied in order to keep the temperature below 60° C. A white, rubbery material is obtained. Yield, approximately 35 parts. The material is insoluble in methanol or acetone or xylene.

*Example 22*

The dichlorhydrin sulphur plastic described under Example 1 reacts with benzoyl chloride. 47 parts benzoylchloride were slowly added to 30 parts sulphur plastic described under Example 1. The reaction with benzoyl chloride is considerably less violent than with phosphoroxychloride. The mass became warm and after approximately 10 minutes reached a temperature of 50° C. Cooling was then applied in order to keep the temperature at approximately 50° C. Again a white, rubbery material was formed which was soluble in diacetone alcohol.

Example 23

The plastic described under Example 1 is useful for the impregnation of paper. The plastic is preferably diluted with one-third its weight or more of ethylene chlorhydrin or of diethylene glycol monoethylether in order to make it more fluid. Tissue paper or glassine paper was impregnated with the above solution and dried at 100–110° C. A clear, transparent paper is thus obtained, having a somewhat tacky surface. In order to harden the surface, treatment of the impregnated paper with the fumes of formaldehyde and hydrochloric acid may be employed. Excellent results have been obtained by exposing the impregnated paper 1 hour to the fumes of a mixture of 100 parts 40% formaldehyde and 20 parts 30% hydrochloric acid. The temperature of the mixture was kept at 60° C. After this treatment the surface of the paper becomes non-tacky. By this procedure a flexible, transparent paper of a velvety feel is obtained which has excellent water-, acid-, alkali- and grease-resistant properties. One may omit the dilution and impregnate the paper at higher temperature, sufficiently high to obtain good penetration of the plastic into the paper. Good results have also been obtained by impregnating the tissue paper with glycerol alpha dichlorhydrin and subsequent treatment with aqueous or alcoholic sodium monosulphide solution or vice versa. Paper treated in any of the above ways may be cold- or hot-calendered as desired.

Films of dichlorhydrin sodium polysulphide plastics turn cloudy when immersed in water. It has been found due to a small amount of glycerin present in the sulphur plastic which apparently cannot be completely removed by treatment with water or alcohol or with dilute alkali. Films of the two-component resin composed of dichlorhydrin sodium polysulphide plastic and sulphur chloride phenol resin show excellent resistance to water. The sulphur chloride phenol resin acts as an expelling agent for glycerin. One procedure is to melt the dichlorhydrin sodium polysulphide plastic with sulphur chloride phenol resin and subsequently treat the melt several times with boiling water to remove glycerol or other substances which cause poor water resistance. Whereas the dichlorhydrin sodium polysulphide plastic is insoluble in diacetone alcohol, the two-component resin is extremely soluble in that solvent. Solutions as high as 90 per cent in diacetone alcohol can readily be made. They can be thinned with a mixture of substantially equal weights anhydrous ethyl alcohol or methyl alcohol and benzene or xylene. They can also be thinned with butyl acetate. The sulphur chloride phenol resin solubilizes our new sulphur plastics and enables the use of a cheaper solvent, diacetone alcohol. Generally, the higher the amount of sulphur chloride phenol resin the higher the solubility in diacetone alcohol. A two-component resin consisting of 30 per cent sulphur chloride phenol resin and 70 per cent dichlorhydrin sodium polysulphide plastic is still readily soluble in diacetone alcohol. It is not known at the present time whether by melting dichlorhydrin sodium polysulphide plastic and sulphur chloride phenol resin at approximately 140° C. a reaction takes place or not. The fact that considerable amounts of gas are evolved during the melting operation and that the solubility has been changed indicates the possibility of some change.

In the manufacture of paper products the sulphur-glycerol plastics, ranging in consistency from viscous oils to more solid bodies, have the advantage of being substantially if not entirely free from odor. A sulphur-glycerol plastic made by treating glycerol dichlorhydrin with an alkaline monosulphide possesses the further advantage of being capable of production of very light color, if not even water-white. Therefore, when thin paper is impregnated with such a light colored sulphur-glycerol material a sheet which is normally opaque or only slightly translucent becomes highly translucent or even substantially transparent. The monosulphide product is, however, as indicated somewhat soft and sticky, a quality which in the fibers and recesses of the paper is desirable owing to improved flexibility, nevertheless may be objectionable at the surface. The present invention contemplates the superficial curing of the impregnated paper by exposure to acid vapors or other curing agents such as a mixture of volatile acid and formaldehyde whereby the surface stickiness is removed without necessarily curing the sulphur-glycerol throughout the sheet. The invention, however, is not limited merely to superficial curing, as the depth of curing may be considerable depending upon the thickness of the sheet or even may be carried throughout the sheet. In any event, whether the surface only is cured or the curing advanced to a greater depth, a product is obtained which may be termed a surface-hardened, transparentized paper containing a sulphur-glycerol compound and particularly a compound light in color whereby a white tissue paper is not discolored by the transparentizing treatment. A considerable number of substances which have been proposed for treating paper to improve its transparency or translucency have the disadvantage of discoloring on exposure to light, but the sulphur-glycerol compound made with monosulphide has on test by exposure to sunlight shown a striking resistance to change and therefore may be termed, for practical purposes in the paper industry, as light-stable. Hence the preferred product may be further qualified as a surface-hardened, light-stable transparentized white paper containing a sulphur-glycerol product.

Example 24

Tissue paper impregnated with sodium monosulphide-alpha dichlorhydrin plastic may be coated with cellulose nitrate. This is readily done by dipping the impregnated paper into a dilute solution of low viscosity cellulose nitrate in, for example, alcohol and xylol or in diethyleneglycol monoethylether. After drying a paper remains of great luster and transparency. The coating with cellulose nitrate may also be done after hardening the impregnated tissue paper with formaldehyde and hydrochloric acid as described under Example 23.

Example 25

The flexible resin described under Examples 12 and 13 may also be used to impregnate tissue paper or glassine paper. Sulphur chloride xylenol resin was made by adding 1 part sulphur chloride to 1 part commercial xylenol distillate using benzol as a solvent. A resin was made by melting 6 parts of sodium pentasulphide-alpha dischlorhydrin plastic and 4 parts of the above sulphur chloride xylenol resin for 2 hours at 120–125° C. An 80 per cent solution was made in diacetone alcohol, which solution was subsequently thinned with anhydrous acetone to 60 per cent strength. Tissue paper was impregnated with this solution and dried at approximately 60° C. This impregnation yielded a yellow lustrous water-resistant paper of increased toughness.

*Example 26*

Good results and accelerated hardening of the impregnated paper can be obtained by adding an acid like, for example, phosphoric acid or acetic acid and/or an aldehyde like, for example, formaldehyde, to a solution of the sodium monosulphide dischlorhydrin plastic. 780 parts sodium sulphide ($Na_2S,3H_2O$) were dissolved in 1800 parts of water and to the filtered solution were added 774 parts glycerol alpha dischlorhydrin. Cooling was applied to keep the temperature below 50° C. A white plastic separated out which was washed with water. Yield 577 parts.

To 200 parts of the sulphur dichlorhydrin plastic 50 parts diethyleneglycol monoethylether were added. At 60° C. a clear solution was obtained, to which 4 parts orthophosphoric acid were added. This represents 2 per cent of phosphoric acid based on the weight of the sulphur plastic. As high as 5 per cent of phosphoric acid can be added without causing precipitation of the plastic. The solution so obtained can be thinned with anhydrous alcohols as, for example, anhydrous methyl alcohol and anhydrous ethyl alcohol. To 254 parts of the above solution 75 parts anhydrous ethyl alcohol were added. Tissue paper was impregnated at 40–45° C. with the above solution and after drying at 100–110° C. yielded a transparent flexible paper. To the solution of the sulphur dichlorhydrin plastic in diethyleneglycol monoethylether, after thinning with ethyl alcohol, a small amount of 40% aqueous formaldehyde can be added. This results in quicker hardening of the impregnated paper on drying at elevated temperature.

*Example 27*

We have found that anhydrous acids, like formic acid or acetic acid, dissolve the sulphur dichlorhydrin plastic or can be dissolved in it. The advantage of using an acid as a solvent is that the solvent is at the same time a hardening agent. To 50 parts of the plastic prepared as described under Example 26 was added 20 parts glacial acetic acid. At 60° C. a clear viscous solution was obtained which was thinned with 30 parts anhydrous ethyl alcohol. To this solution a small amount of aqueous formaldehyde may be added. The above solution has been found useful for the preparation of transparent paper.

*Example 28*

A convenient procedure for making a solution of sulphur dichlorhydrin plastic is by employing an excess of glycerol alpha dichlorhydrin in which latter ingredient the plastic is substantially soluble. 130 parts sodium monosulphide ($Na_2S$, $3H_2O$) were dissolved in 350 parts water. After filtering, 166 parts glycerol alpha dichlorhydrin were added with cooling and agitation. Optimum yields are produced by maintaining a temperature of 40–50° C. After the reaction is substantially complete the temperature is raised to 80° C. The bottom layer, consisting of a solution of the sulphur plastic in excess dichlorhydrin, was separated and used for the impregnation of tissue paper.

*Example 29*

Quick hardening can be obtained by dipping the paper to be impregnated first in a 40% aqueous formaldehyde solution and subsequently in a solution of the sulphur plastic in, for example, diethyleneglycol monoethylether containing 2 per cent or more of orthophosphoric acid based on the weight of the sulphur plastic. In the above case good hardening resulted after drying the impregnated tissue paper 15 minutes at 80° C.

The above examples show that paper impregnated with a sulphur glycerol alpha dichlorhydrin plastic can be hardened either on the surface or internally by the application of heat or the addition of acids or aldehydes or a combination of these methods. While we have described certain methods of carrying out the hardening, the invention is not limited thereto, as hardening may be carried out, for example, before impregnating the paper or by the combined effect of heat and an aldehyde or by an aldehyde and an acid without heat.

*Example 30*

The two-component resins described under Examples 12, 13 and 25 can be dissolved in acetone at elevated temperature. A convenient method is to heat the two-component resin to approximately 100° C., which temperature is sufficient to melt the resin, and then to add a small amount of acetone. The solution of acetone in the resin can then be further thinned with acetone at a temperature below the boiling point of acetone. The acetone solution can be diluted with a mixture of an anhydrous alcohol as, for example, ethyl alcohol or methyl alcohol, and an aromatic hydrocarbon as, for example, benzene, toluene or xylene. To solutions so prepared a small amount of paraffin wax or ozokerite may be added. The solutions herein described have been found useful for the impregnation of paper.

*Example 31*

The dichlorhydrin polysulphide plastics as described in Example 13 can be used for the impregnation of paper. Our preferred solvents are ethylene chlorhydrin or diethyleneglycol monoethylether. After impregnation of paper and removal of the solvent a lustrous water resistant paper remains.

*Example 32*

60 parts of a two-component resin, similar to the ones described under Examples 12, 13, 25 and 30, consisting of 50 per cent alpha dichlorhydrin sodium pentasulphide plastic and 50 per cent sulphur chloride xylenol resin, were dissolved in 20 parts acetone. To this solution was added 20 parts of a mixture of 5 parts methyl alcohol and 15 parts toluol. To this 60 per cent solution of the resin was added at approximately 60° C. 600 mgms. ceresin wax. Tissue paper was impregnated at 60° C. and air dried. A light yellow lustrous paper of great flexibility and increased toughness resulted. The moisture transmission value of the so-impregnated paper was determined by covering a crystallizing dish, diameter 2 inches, containing 10 gs. water with the impregnated paper. The dish was sealed by means of tight fitting rubber bands and weighed. A similar dish was covered in a similar way with untreated tissue paper. Both dishes were placed in a desiccator containing 98 per cent sulphuric acid. After 18 hours the dish covered with the impregnated paper had only lost 60 mgms. in weight, whereas the dish covered with the untreated tissue paper had lost 822 mgms. This example illustrates the excellent waterproofing characteristics of the two-component resin referred to above.

While we have referred to the waterproofing effect secured by the use of the two-component sulphur-containing materials specified, we aim particularly to impregnate thin paper to obtain an impregnation which serves to prevent to a very large extent the migration of water vapor through the sheet. This quality of resistance to moisture migration or moisture transmission is of importance in the production of thin substantially transparent or translucent wrapping papers which serve for use in the packaging of moist foodstuffs which are required to retain moisture or dry foodstuffs which must be prevented from becoming sticky. In like manner cigarettes and cigars, singly or in packages, may be wrapped with such paper having high moisture transmission resistance, using the paper in the manner in which, for example, "Cellophane" is now employed but with the added advantage of relatively low cost of production of the impregnated paper in comparison with the cost of making "Cellophane" of the water resistant type. It should be noted that in using the glycerin polysulphide with the xylenol sulphur choride resin the resulting impregnation imparts a light yellow color to white tissue paper. When this color is objectionable the composition may be bleached or the lighter colored components previously described may be employed. One advantage of the resin made from xylenol and sulphur chloride is its low cost but resinous bodies of an analogous character and frequently lighter in color may be made from phenol and the cresols, particularly meta and para cresol. Glycerol pentasulphide or other glycerol polysulphide usually has a yellow cast, whereas the glycerol monosulphide can be made practically water white and after impregnation suitably hardened with an acid hardening agent or other body capable of increasing the consistency.

For the purpose of impregnating tissue paper it is preferably passed through a bath of the solution of the desired plastic or plastic mixture and then through squeeze rolls, whereupon it may be dried with the application of such an amount of heat as may be necessary to secure the requisite hardness or absence of stickiness.

If necessary the impregnation may be carried out using two or more baths, especially when a very heavy impregnation with some measure of coating is desired. For impregnation if an especially glossy or highly surfaced finish is desired the impregnated paper may be sprayed thus creating a surface finish. In general the hardening should be carried only to the point where the paper is still quite flexible, as a brittle impregnation causes the transparent or translucent paper to become opaque at the points where it is folded or crumpled or creased and this frequently is objectionable. The composition therefore is selected with respect to flexibility and hardening, in case this step is carried out, is conducted likewise with the object of keeping the transparentized moisture resistant paper of as flexible a character as is consistent without stickiness or tackiness.

What we claim is:

1. The plastic materials as described, containing the reaction product of glycerol dichlorhydrin and an alkali polysulphide, said reaction product being soluble in a restricted number of organic solvents.

2. The plastic materials as described, containing the reaction product of glycerol dichlorhydrin and an alkali polysulphide.

3. The reaction product of glycerol alpha dichlorhydrin and an alkali polysulphide blended with another resin.

4. The reaction product of glycerol alpha dichlorhydrin and an alkali pentasulphide.

5. The plastic materials as described, containing the reaction product of glycerol alpha dichlorhydrin and an alkaline sodium pentasulphide.

6. A reaction product of one mol of a glycerol dichlorhydrin with several mols of an alkali metal polysulphide.

7. A reaction product of 1 mol of glycerol dichlorhydrin with at least about 3 mols of alkali metal polysulphide.

8. A product according to claim 2 compatible with phenol sulphur chloride resins.

9. A composition comprising a phenolic sulphur chloride resin and the reaction product of glycerol chlorhydrin with an alkali sulphide.

10. A composition comprising shellac and products according to claim 2.

11. A composition soluble in acetone comprising a mixture of xylenol sulphur chloride resin and the reaction product of glycerol dichlorhydrin with alkali pentasulphide.

12. A composition soluble in acetone comprising a mixture of xylenol sulphur chloride resin and the reaction product of glycerol dichlorhydrin with alkali metal polysulphide.

13. A solution of the reaction product of a glycerol dichlorhydrin with an alkali metal polysulphide in a solvent selected from the herein described group consisting of hexahydrophenol, diethylene glycol, diethylene glycol monoethyl ether, ethylene chlorhydrin, diethylene dioxide, phenol, cresol and xylenol.

14. A composition soluble in diacetone alcohol comprising a mixture of xylenol sulphur chloride resin and the reaction product of glycerol dichlorhydrin with alkali pentasulphide.

15. Articles coated with compositions according to claim 2.

16. Metal coated with compositions according to claim 2.

17. A body carrying a baked coating comprising the products of claim 2.

18. A solution of the water-insoluble and alcohol-insoluble reaction product of a glycerol dichlorhydrin with an alkali metal polysulphide in a solvent selected from the herein described group consisting of hexahydrophenol, diethylene glycol, diethylene glycol monoethyl ether, ethylene chlorhydrin, diethylene dioxide, phenol, cresol and xylenol.

19. The reaction product of glycerol alpha dichlorhydrin and an alkali polysulphide.

20. A composition comprising a phenolic sulphur chloride resin and the reaction product of glycerol alpha chlorhydrin with an alkali sulphide.

21. A composition soluble in acetone comprising a mixture of xylenol sulphur chloride resin and the reaction product of glycerol alpha dichlorhydrin with alkali pentasulphide.

22. A composition soluble in diacetone alcohol comprising a mixture of xylenol sulphur chloride resin and the reaction product of glycerol alpha dichlorhydrin with alkali pentasulphide.

23. Articles coated with compositions according to claim 19.

24. Metal coated with compositions according to claim 19.

25. A reaction product of one mol of a glycerol alpha dichlorhydrin with several mols of an alkali metal polysulphide.

26. A reaction product of 1 mol of glycerol alpha dichlorhydrin with at least about 3 mols of alkali metal polysulphide.

27. A composition soluble in acetone comprising a mixture of xylenol sulphur chloride resin and the reaction product of glycerol alpha dichlorhydrin with alkali metal polysulphide.

28. A solution of the reaction product of a glycerol alpha dichlorhydrin with an alkali metal polysulphide in a solvent selected from the herein described group consisting of hexahydrophenol, diethylene glycol, diethylene glycol monoethyl ether, ethylene chlorhydrin, diethylene dioxide, phenol, cresol and xylenol.

CARLETON ELLIS.
WILLIAM P. ter HORST.